(12) United States Patent
Muller et al.

(10) Patent No.: US 7,885,334 B2
(45) Date of Patent: Feb. 8, 2011

(54) IMAGE CODING OR DECODING DEVICE AND METHOD INVOLVING MULTITHREADING OF PROCESSING OPERATIONS OVER A PLURALITY OF PROCESSORS, AND CORRESPONDING COMPUTER PROGRAM AND SYNCHRONISATION SIGNAL

(75) Inventors: Matthieu Muller, Rennes (FR); Mickael Ropert, Miniac Morvan (FR); Alex Macaulay, Rennes (FR); Erwan Le Bras, Rennes (FR)

(73) Assignee: Envivio France, Cesson-Sevigne (FR)

( * ) Notice: Subject to any disclaimer, the term of this patent is extended or adjusted under 35 U.S.C. 154(b) by 1497 days.

(21) Appl. No.: 10/555,498

(22) PCT Filed: May 6, 2004

(86) PCT No.: PCT/FR2004/001106

§ 371 (c)(1),
(2), (4) Date: Nov. 3, 2005

(87) PCT Pub. No.: WO2004/100557

PCT Pub. Date: Nov. 18, 2004

(65) Prior Publication Data

US 2007/0053437 A1 Mar. 8, 2007

(30) Foreign Application Priority Data

May 6, 2003 (FR) .................................. 03 05531

(51) Int. Cl.
*H04N 7/12* (2006.01)
(52) U.S. Cl. ................................ 375/240.24
(58) Field of Classification Search ......... 382/302–304, 382/232–251; 375/240.01–240.27; 341/50; 718/105–106
See application file for complete search history.

(56) References Cited

U.S. PATENT DOCUMENTS 6,172,621 B1 * 1/2001 Iwata .......................... 341/50

(Continued)

FOREIGN PATENT DOCUMENTS

WO  WO 99/63751  12/1999

OTHER PUBLICATIONS

P. Kolinummi et al., "Scalable Implementation of H.263 Video Encoder on a Parallel DSP System," IEEE Internat'l Symposium on Circuits and Systems, May 28-31, 2000, pp. I-551 to I-554.

*Primary Examiner*—Sherali Ishrat
(74) *Attorney, Agent, or Firm*—David D. Brush; Westman, Champlin & Kelly, P.A.

(57) ABSTRACT

A method and apparatus are provided for coding or decoding an image comprising macro-blocks which are distributed in lines and columns. The processing of at least one given macro-block requires the pre-processing of at least one other macro-block on which said dependent macro-block depends. Moreover, the macro-blocks are processed sequentially line by line or column by column. Processing of the macro-blocks is multithreaded over N processors, $N \geq 2$. The image is separated into N vertical bands each comprising a plurality of lines and at least one column of macro-blocks if the macro-block is processed sequentially line by line, or into N horizontal bands each comprising a plurality of columns and at least one line of macro-blocks if the macro-block is processed sequentially column by column. One of the N bands is processed by each processor, and the processing operations performed by the N processors is synchronized.

10 Claims, 1 Drawing Sheet

U.S. PATENT DOCUMENTS

| | | | |
|---|---|---|---|
| 6,263,023 B1 | 7/2001 | Ngai | 375/240.12 |
| 7,634,776 B2 * | 12/2009 | Parameswaran et al. | 718/105 |
| 2003/0189982 A1 * | 10/2003 | MacInnis | 375/240.24 |
| 2007/0086528 A1 * | 4/2007 | Mauchly et al. | 375/240.24 |

* cited by examiner

_US 7,885,334 B2_

IMAGE CODING OR DECODING DEVICE AND METHOD INVOLVING MULTITHREADING OF PROCESSING OPERATIONS OVER A PLURALITY OF PROCESSORS, AND CORRESPONDING COMPUTER PROGRAM AND SYNCHRONISATION SIGNAL

CROSS-REFERENCE TO RELATED APPLICATION

This Application is a Section 371 National Stage Application of International Application No. PCT/FR2004/001106, filed May 6, 2004 and published as WO 2004/100557 A2 on Nov. 18, 2004, not in English.

FIELD

This disclosure relates to the coding/decoding of digital images.

BACKGROUND

Typically, a digital image includes macroblocks distributed in lines and columns. Each line (or horizontal row) of the image includes, for example, macroblocks of 16×16 pixels. Conventionally, a macroblock is organised into four luma blocks and two, four or eight chroma blocks according to the type of sampling.

Traditionally, the coding or decoding of an image involves processing all of its macroblocks, sequentially, line by line, from left to right over a single line, and from top to bottom from one line to the next.

An embodiment of the invention applies in particular, but not exclusively, to the coding or decoding of a video sequence formed by a series of images. In this case, the coding or decoding technique is implemented in a video compression or decompression algorithm. It is thus consistent with a compression/decompression standard such as (this list is not exhaustive):

the H.263 standard, defined in the standardisation document as "ITU-T H.263";
the H.263+ standard, defined in the standardisation document as "ITU-T H.263+";
the H.264 standard (also referred to as H.26L or MPEG-4 AVC): defined in the standardisation document as "ISO MPEG-4 Part 10";
the MPEG-4 Video standard: defined in the standardisation document as "ISO MPEG-4 Part 2".

It is, however, clear that an embodiment of the invention also applies to the coding or decoding of a fixed image.

An embodiment of the invention can also apply wherever there is a spatial dependence context for the processing of macroblocks of an image. In other words, it is assumed that to process each macroblock of the image, it is necessary to know the result of the previous processing of other macroblocks of the same image.

Such a spatial dependence context exists in particular, but not exclusively, in the methods for coding or decoding consistent with the aforementioned compression/decompression standards based on a motion estimation. FIG. 1 shows the spatial dependence context as defined in these standards. To process a given macroblock MB, it is necessary to know the result of the processing of the left macroblock ($MB_G$), that of the upper macroblock ($MB_H$) and that of the right macroblock ($MB_D$).

The processing of all of the macroblocks of an image by a single processor does not appear to be optimal in terms of computing time.

In addition, a multithreading technique is known, which involves optimally distributing (i.e. multithreading) the computing loads for processing over a plurality of available processors.

This known technique is used in the field of video compression, according to either a general approach or a narrow approach.

The general approach includes distributing macro-tasks over each of the processors. For example, it is assumed that the coding of an image requires three tasks A, B and C to be executed which must be ordered as follows: A, then B, then C. It can then be imagined that to best distribute the tasks A, B and C over two processors, two threads T1 and T2 are created, with T1 managing only tasks A ad B and T2 managing only task C. This multithreading can be carried out only if T1 can work on image N while T2 works on image N−1, with N being the number of the image of a video sequence. It can be seen that this distribution is optimal only if the load used by tasks A and B is substantially equivalent to that used by task C (isodistribution of loads between processors).

A disadvantage of the multithreading technique according to the general approach is that the isodistribution of the loads between processors is almost never verified in practice. In other words, it is very difficult, and even impossible in some cases, to find a perfect balance by separating entire tasks from one another.

Another disadvantage of the multithreading technique according to the general approach is that it requires a specific implementation of the calling program, with the use of a stacking mechanism.

Yet another disadvantage of the multithreading technique according to the general approach is that it cannot be applied in the case of a spatial dependence context as described above.

The narrow approach includes separating each task into as many basic tasks as can be executed simultaneously by a plurality of processors, when possible. For example, in the field of video compression or image compression (with the aforementioned conventional sequential processing order: line by line, from left to right over the same line, and from top to bottom from one line to the next), the image can be separated into N horizontal bands and have each of them processed by one of N processors. In this case, it is not necessary for the different threads to be mutually synchronised. They must simply inform a main thread when they have completed their processing. This provides a very balanced distribution of loads between processors.

However, a major disadvantage of the multithreading technique according to the narrow approach is that it cannot be applied in the case of a spatial dependence context as described above. Indeed, in this context, each first line of a given horizontal band (lower band) of the image cannot be processed as long as the last line of the horizontal band located above (upper band) has not been processed. The processors could therefore only act in series and not simultaneously, which counteracts any benefit of the use of this technique in this context.

SUMMARY

An embodiment of the invention provides a method and a device for coding or decoding enabling the computing time to be optimised while being capable of being implemented in a spatial dependence context as described above.

Another embodiment of the invention provides such a method and device that can be implemented independently of any hardware or software.

For example, one embodiment of the invention provides a method for coding or decoding an image including macroblocks distributed in lines and columns, the processing of at least one given macroblock, referred to as a dependent macroblock, requiring the prior processing of at least one other macroblock on which said dependent macroblock depends, in which the processing of the macroblocks is performed sequentially line by line or column by column. According to this embodiment, the method includes a step of multithreading the processing of the macroblocks over N processors, with N≧2, including the following steps:

separation of the image:
into N vertical bands each including a plurality of lines and at least one column of macroblocks, if the processing of macroblocks is performed sequentially line by line;
into N horizontal bands each including a plurality of columns and at least one line of macroblocks, if the processing of macroblocks is performed sequentially column by column;

processing by each processor of one of the N bands;
synchronisation of the processing operations carried out by the N processors.

An embodiment of the invention therefore performs multithreading according to the narrow approach, but by separating the image into perpendicular (and not parallel) bands in the direction of sequential processing of the macroblocks. This makes it possible to obtain an optimal load distribution between processors.

In other words, if the processing of macroblocks is performed sequentially line by line (classical case of a sequential processing direction that is horizontal, along a line), the image is separated into vertical bands. If, on the other hand, the processing of macroblocks is performed sequentially column by column (an unusual case today, but possible in the future for a sequential processing direction that is vertical, along a column), the image is separated into horizontal bands.

The synchronisation of processing operations carried out by the N processors enables the implementation of the general principle mentioned above in a spatial dependence context. Indeed, this synchronisation makes it possible to prevent a processor from attempting to process a given macroblock when other macroblocks on which this given macroblock is dependent have not yet been processed.

It should be noted that this embodiment can be implemented with any number of processors (for example, two, four, eight, . . . ).

The synchronisation of the processing operations carried out by the n processors preferably includes, for each processor of each pair of processors processing two adjacent bands, of:
informing the other processor of said pair about each completed processing of a macroblock on which a dependent macroblock included in the band processed by said other processor depends;
verifying, before processing a dependent macroblock, that said at least one other macroblock on which the dependent macroblock depends has previously been processed by said processor or said other processor.

Thus, the processors exchange synchronisation signals (system messages) by informing one another of the macroblocks that they have processed.

Said image advantageously belongs to the group including: video sequence images formed by a series of images; fixed images.

In an advantageous embodiment of the invention, the processing of macroblocks is performed sequentially line by line, from left to right over the same line and from top to bottom from one line to the next.

The processing of each dependent macroblock advantageously requires the prior processing, when it exists, of at least the macroblock located to the left of said dependent macroblock. Moreover, in each pair of processors processing two adjacent vertical bands, the processor that processes the left vertical band informs the other processor of each completed processing of the macroblock of the right end of one of the lines of macroblocks of said left vertical band.

According to an advantageous feature, the processing of each dependent macroblock requires the prior processing, when it exists, of at least the macroblock located above and to the right of said dependent macroblock. In addition, in each pair of processors that process two adjacent vertical bands, the processor that processes the right vertical band informs the other processor of each completed processing of the macroblock of the left end of one of the lines of macroblocks of said right vertical band.

It should be noted that this feature (information on the completed processing of the left macroblock ($MB_G$) of a line of the right vertical band) can be combined with the previous (information on the completed processing of the right macroblock ($MB_D$) of a line of the left vertical band). The embodiment thus provides an optimal solution to the classical spatial dependence context (see discussion above, in relation to FIG. 1). It should be noted that the completed processing of the upper macroblock ($MB_H$) requires no synchronisation information since it is included in the same vertical band as the macroblock (MB) dependent on it (and the left and right macroblocks ($MB_G$, $MB_D$).

The coding or decoding is advantageously consistent with a standard belonging to the group including: H.263, H.263+, H264 and MPEG-4 Video.

This list is not exhaustive.

Another embodiment of the invention relates to a computer program including program code instructions for carrying out the steps of the aforementioned method, when said program is run on a computer.

An embodiment also relates to a device for coding or decoding an image including macroblocks distributed in lines and columns, the processing of at least one given macroblock, referred to as a dependent macroblock, requiring the prior processing of at least one other macroblock on which said dependent macroblock depends, in which the processing of the macroblocks is performed sequentially line by line or column by column, with said device including N processors, with N≧2, and means for multithreading the processing of macroblocks over said N processors, which means for multithreading the processing include:

means for separating the image:
into N vertical bands each including a plurality of lines and at least one column of macroblocks, if the processing of macroblocks is performed sequentially line by line;
into N horizontal bands each including a plurality of columns and at least one line of macroblocks, if the processing of macroblocks is performed sequentially column by column;

in each processor, means for processing one of the N bands;
means for synchronising the processing operations performed by the N processors.

An embodiment also relates to a synchronisation signal transmitted from a first to a second processor of a pair of processors that process two adjacent bands of an image, wherein said image includes macroblocks distributed in lines and columns and being separated:

into N vertical bands each including a plurality of lines and at least one column of macroblocks, if the processing of macroblocks is performed sequentially line by line;

into N horizontal bands each including a plurality of columns and at least one line of macroblocks, if the processing of macroblocks is performed sequentially column by column;

the processing of at least one given macroblock, referred to as a dependent macroblock, requiring the prior processing of at least one other macroblock on which said dependent macroblock depends, said first and second processors belonging to a set of N processors each simultaneously processing one of the bands of the image, in order to code or decode the image, said synchronisation signal including information by way of which said first processor informs the second processor of the completed processing by the first processor of a macroblock on which a dependent macroblock included in the band processed by the second processor depends, so that the second processor can verify, before processing said dependent macroblock, that said at least one other macroblock on which the dependent macroblock depends has previously been processed by the first processor.

Other features and advantages of embodiments of the invention will appear in the following description of a preferred embodiment of the invention, given as an indicative and non-limiting example, and appended drawings. However, embodiments of the invention are not limited to these features and advantages or required to include such features or advantages.

DETAILED DESCRIPTION OF THE PREFERRED EMBODIMENTS

An embodiment of the invention relates to a method for coding or decoding an image including a step of multithreading the processing of macroblocks over N processors.

In the description below, it is assumed that, as usual according to an embodiment of the invention, the processing of macroblocks is performed sequentially line by line, from left to right over the same line and from top to bottom from one line to the next. However, it is clear, as already indicated above, that one or more embodiments of this invention can also be applied to the case (which is uncommon today) in which the processing of macroblocks is carried out sequentially column by column.

Figure 1:
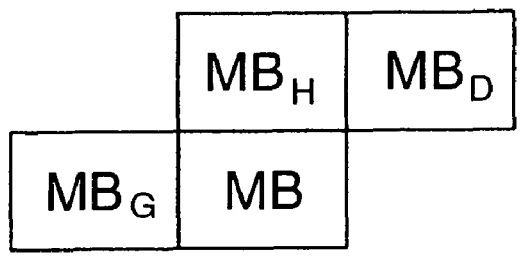
FIG. 1 shows the classical spatial dependence context for the processing of a macroblock of an image.

It is also assumed, in an embodiment of the invention, that the image to which the method is applied is included in a video sequence and that the method is consistent with one of the following compression/decompression standards: H.263, H.263+, H.264, MPEG-4 Video, etc. It is therefore assumed that the processing of the macroblocks of an image is carried out in the spatial dependence context shown in FIG. 1 and already discussed above. For the record, the processing of a given macroblock MB requires the knowledge of the result of the processing of the macroblock located to the left ($MB_G$), that located above ($MB_H$) and that located to the right ($MB_D$).

The method according to an embodiment of the invention, in view of the aforementioned hypotheses, includes, but is not limited to:

separating the image into N vertical bands each including a plurality of lines and at least one column of macroblocks;

assigning the processing of each of these N bands to a distinct processor;

synchronising the processing operations carried out by the N processors, to prevent a processor from attempting to access (needing to process a macroblock of the vertical band that is processing) another macroblock (of another vertical band processed by another processor) which would not yet have been processed.

A specific embodiment of the method according to the invention will now be described in detail, with reference to FIG. 2.

Figure 2:
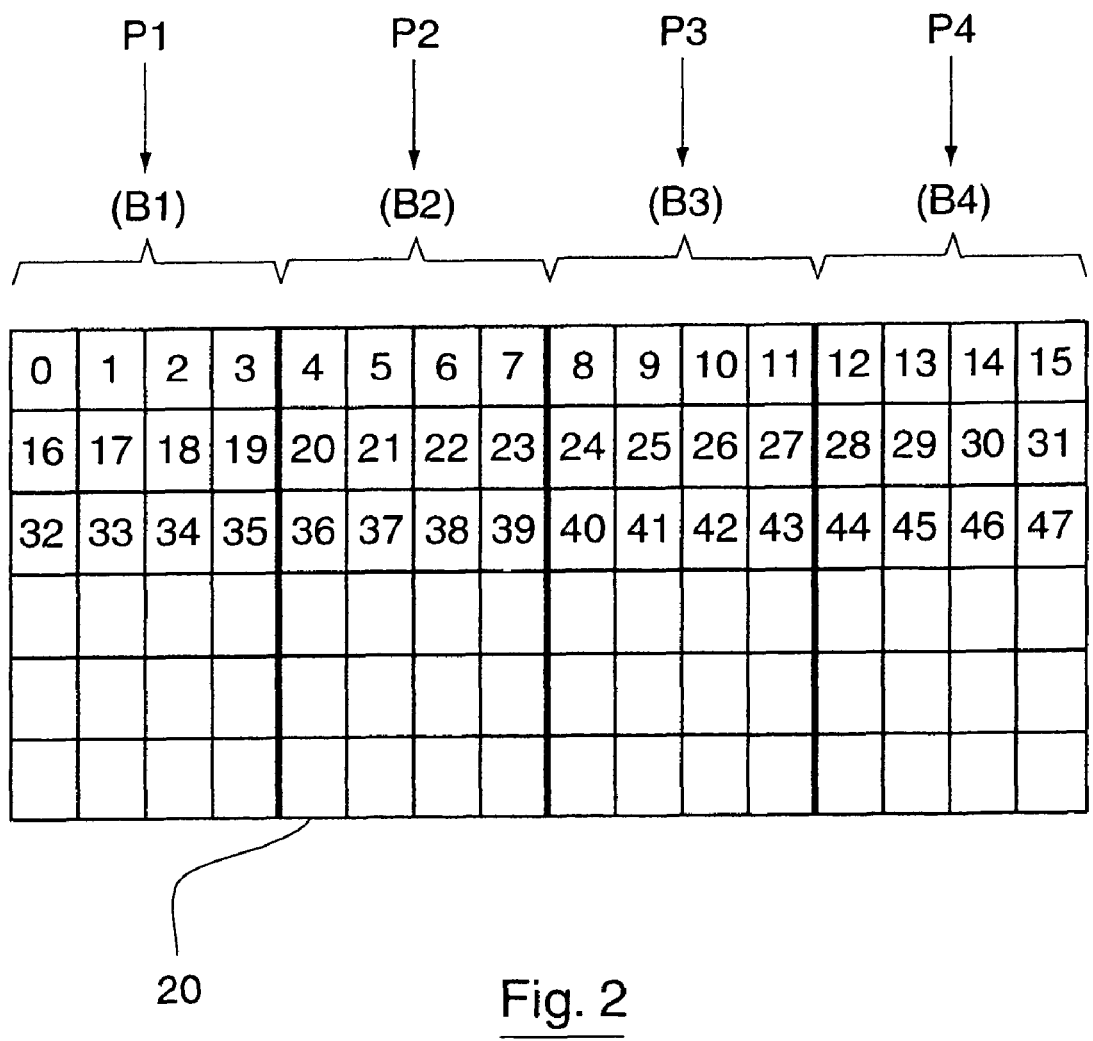
FIG. 2 shows an example of an image separated into two vertical bands, showing a specific embodiment of the invention.

FIG. 2 shows, as an example, an image 20 including 6 lines and 16 columns. Each line therefore includes 16 macroblocks. For the only three first lines (for the sake of simplification), the number of the macroblock has been inserted into each box representing a macroblock. The first line includes macroblocks MB0 to MB15, the second includes macroblocks MB16 to MB31, and so on.

In this example, the image is separated into four vertical bands (N=4) of equal width (four macroblocks) hereinafter referred to as bands B1 to B4 (with the bands being numbered from left to right). Therefore, four processors are used to process each of these four vertical bands. These four processors are hereinafter referred to as P1 to P4 (with the number of the processors corresponding to the number of the bands that they process).

The operation of the method according to an embodiment of the invention can be summarised as follows:

the processor P1 starts and processes (i.e. computes the data on) the macroblocks MB0, MB1, MB2 and MB3;

when macroblock MB3 has been processed, processor P1 informs processor P2 of it with a synchronisation message, i.e. it indicates to processor P2 that the latter can start and process macroblock MB4. Indeed, macroblock MB3 is the macroblock to the left $MB_G$ of macroblock MB4;

processors P1 and P2 simultaneously perform processing operations: processor P1 processes macroblocks MB16, MB17 and MB18, and processor P2 processes macroblocks MB4, MB5, MB6 and MB7;

when macroblock MB4 has been processed, processor P2 informs processor P1 of it with a synchronisation message;

when processor P1 is ready to process macroblock MB19, it verifies that macroblock MB4 has been processed by processor P2. Indeed, macroblock MB4 is the macroblock above and to the right $MB_D$ of macroblock MB19. In addition, processor P1 has already processed the left macroblock $MB_G$ (in this case MB18) and the macroblock $MB_H$ (in this case MB3) above macroblock MB4. If macroblock MB4 has been processed by processor P2, processor P1 processes macroblock MB19;

when macroblock MB19 has been processed, processor P1 informs processor P2 of it with a synchronisation message, i.e. it indicates to processor P2 that the latter can start the second line of the vertical band B2 and process macroblock MB20. Indeed, macroblock MB19 is the macroblock to the left $MB_G$ of macroblock MB20. In addition, processor P2 has already processed the above macroblock $MB_H$ (in this case MB4) and the macroblock above and to the right $MB_D$ (in this case MB5) of macroblock MB20;

when macroblock MB7 has been processed, processor P2 informs processor P3 of it with a synchronisation message, i.e. it indicates to processor P3 that the latter can start and process macroblock MB8. Indeed, macroblock MB7 is the macroblock to the left $MB_G$ of macroblock MB8;

processors P1, P2 and P3 simultaneously perform processing operations: processor P1 processes macroblocks MB31, MB32 and MB33, and processor P2 processes macroblocks MB20, MB21 and MB22, and processor P3 processes macroblocks MB8, MB9, MB10 and MB11;

and so on until all of the macroblocks of all of the vertical bands B1 to B4 have been processed by processors P1 to P4.

In general, the principle of synchronising the processing operations carried out by the processors is based on the use of synchronisation messages (system messages). In the example above, there are three synchronisation points (one between each pair of processors (Pk, Pk+1) processing two adjacent vertical bands): one between processors P1 and P2, one between processors P2 and P3 and one between processors P3 and P4. Two types of conditions correspond to each synchronisation point:

at each end of line of row i+1 of the band Bk (which corresponds to a quarter of a line of an image), the processor Pk must ensure that the condition "first macroblock of the line of row i of the band Bk+1 (which also corresponds to a quarter of a line of an image) has been processed" has been satisfied by the processor Pk+1. For example, at the end of the second line of band B1 (for the processing of macroblock MB19), processor P1 must ensure that the condition "first macroblock MB4 of the first line of band B2 has been processed" has been satisfied by processor P2;

at each start of line of row i of the band Bk+1, the processor Pk+1 must ensure that the condition "last macroblock of the line of row i of the band Bk+1 has been processed" has been satisfied by the processor Pk. For example, at the beginning of the first line of band B2 (for the processing of macroblock MB4), processor P2 must ensure that the condition "last macroblock MB3 of the first line of band B1 has been processed" has been satisfied by processor P1.

The invention claimed is:

1. Method for coding or decoding an image including macroblocks distributed in lines and columns, comprising:

processing of the macroblocks sequentially line by line or column by column, wherein the processing of at least one given macroblock, referred to as a dependent macroblock, requires prior processing of at least one other macroblock on which said dependent macroblock depends; and multithreading the processing of the macroblocks over N processors, with N≧2, including the following steps: separation of the image:

into N vertical bands each including a plurality of lines and at least one column of macroblocks, if the processing of macroblocks is performed sequentially line by line;

into N horizontal bands each including a plurality of columns and at least one line of macroblocks, if the processing of macroblocks is performed sequentially column by column;

processing by each processor of one of the N bands; and synchronisation of the processing operations carried out by the N processors.

2. Method according to claim 1, wherein the synchronisation of the processing operations carried out by the N processors comprises, for each processor of each pair of processors that process two adjacent bands:

informing the other processor of said pair about each completed processing of a macroblock on which a dependent macroblock included in the band processed by said other processor depends; and verifying, before processing a dependent macroblock, that said at least one other macroblock on which the dependent macroblock depends has previously been processed by said processor or said other processor.

3. Method according to claim 1, wherein said image belongs to the group including:

video sequence images formed by a series of images; and fixed images.

4. Method according to claim 1, wherein the processing of the macroblocks is carried out sequentially, line by line, from left to right over the same line and from top to bottom from one line to the next.

5. Method according to claim 4, wherein the processing of each dependent macroblock requires the prior processing, when it exists, of at least the macroblock located to the left of said dependent macroblock, and wherein, in each pair of processors that process two adjacent vertical bands, the processor that processes the left vertical band informs the other processor of each completed processing of the macroblock of the right end of one of the lines of macroblocks of said left vertical band.

6. Method according to claim 4, wherein the processing of each dependent macroblock requires the prior processing, when it exists, of at least the macroblock located above and to the right of said dependent macroblock, and wherein, in each pair of processors that process two adjacent vertical bands, the processor that processes the right vertical band informs the other processor of each completed processing of the macroblock of the left end of one of the lines of macroblocks of said right vertical band.

7. Method according to claim 1, wherein the coding or decoding is consistent with a standard belonging to the group including: H.263, H.263+, H264 and MPEG-4 Video.

8. A non-transitory computer readable medium containing a computer program, comprising program code instructions to implement a method, when said program is run on a computer, for coding or decoding an image including macroblocks distributed in lines and columns, the method comprising:

processing the macroblocks sequentially line by line or column by column, wherein the processing of at least one given macroblock, referred to as a dependent macroblock, requires prior processing of at least one other macroblock on which said dependent macroblock depends; and multithreading the processing of the macroblocks over N processors, with N≧2, including the following steps: separation of the image:

into N vertical bands each including a plurality of lines and at least one column of macroblocks, if the processing of macroblocks is performed sequentially line by line;

into N horizontal bands each including a plurality of columns and at least one line of macroblocks, if the processing of macroblocks is performed sequentially column by column;

processing by each processor of one of the N bands; and synchronisation of the processing operations carried out by the N processors.

9. Device for coding or decoding an image including macroblocks distributed in lines and columns-wherein said device comprises:

N processors, with $N \geq 2$, which process the macroblocks, wherein processing of at least one given macroblock, referred to as a dependent macroblock, requires prior processing of at least one other macroblock on which said dependent macroblock depends, wherein the processing of the macroblocks is performed sequentially line by line or column by column; and means for multithreading the processing of macroblocks over said N processors, which means for multithreading the processing include:

means for separating the image:

into N vertical bands each including a plurality of lines and at least one column of macroblocks, if the processing of macroblocks is performed sequentially line by line; and into N horizontal bands each including a plurality of columns and at least one line of macroblocks, if the processing of macroblocks is performed sequentially column by column;

in each processor, means for processing one of the N bands; and means for synchronising the processing operations performed by the N processors.

10. A method comprising:

generating a synchronisation signal to be transmitted from a first to a second processor of a pair of processors that process two adjacent bands of an image, wherein said image includes macroblocks distributed in lines and columns and is separated:

into N vertical bands each including a plurality of lines and at least one column of macroblocks, if the processing of macroblocks is performed sequentially line by line; or into N horizontal bands each including a plurality of columns and at least one line of macroblocks, if the processing of macroblocks is performed sequentially column by column;

wherein processing of at least one given macroblock, referred to as a dependent macroblock, requires prior processing of at least one other macroblock on which said dependent macroblock depends, said first and second processors belonging to a set of N processors each simultaneously processing one of the bands of the image, in order to code or decode the image;

including into said synchronisation signal information by way of which said first processor informs the second processor of the completed processing by the first processor of a macroblock on which a dependent macroblock included in the band processed by the second processor depends, so that the second processor can verify, before processing said dependent macroblock, that said at least one other macroblock on which the dependent macroblock depends has previously been processed by the first processor; and transmitting the synchronization signal from the first processor to the second processor.

* * * * *